(12) United States Patent
Yatagawa et al.

(10) Patent No.: US 11,562,861 B2
(45) Date of Patent: Jan. 24, 2023

(54) MANUFACTURING METHOD OF CERAMIC ELECTRONIC DEVICE

(71) Applicant: TAIYO YUDEN CO., LTD., Tokyo (JP)

(72) Inventors: Kiyoshiro Yatagawa, Takasaki (JP); Satoshi Kobayashi, Takasaki (JP); Takahisa Fukuda, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 17/669,145

(22) Filed: Feb. 10, 2022

(65) Prior Publication Data

US 2022/0165505 A1 May 26, 2022

Related U.S. Application Data

(62) Division of application No. 16/737,619, filed on Jan. 8, 2020, now Pat. No. 11,417,468.

(30) Foreign Application Priority Data

Jan. 21, 2019 (JP) .............................. JP2019-007723
Sep. 25, 2019 (JP) .............................. JP2019-174522

(51) Int. Cl.
*H01G 4/30* (2006.01)
*H01G 4/12* (2006.01)
*H01G 4/248* (2006.01)

(52) U.S. Cl.
CPC ............. *H01G 4/30* (2013.01); *H01G 4/1209* (2013.01); *H01G 4/248* (2013.01)

(58) Field of Classification Search
CPC ........ H01G 4/30; H01G 4/1209; H01G 4/248; H01G 2/02

(Continued)

(56) References Cited

U.S. PATENT DOCUMENTS 9,019,690 B2 * 4/2015 Hong ..................... H01G 4/008
361/301.2
11,417,468 B2 8/2022 Yatagawa et al.
(Continued)

FOREIGN PATENT DOCUMENTS

CN 1444239 A 9/2003
CN 104681276 A 6/2015
(Continued)

OTHER PUBLICATIONS

Non-final Office Action issued by U.S. Patent and Trademark Office, dated Sep. 22, 2021, for U.S. Appl. No. 16/737,619 (13 pages).
(Continued)

*Primary Examiner* — Arun Ramaswamy
(74) *Attorney, Agent, or Firm* — Law Office of Katsuhiro Arai

(57) ABSTRACT

A manufacturing method of a ceramic electronic device includes: preparing a ceramic electronic device having a multilayer chip, a first external electrode, and a second external electrode, and bonding an organic compound having a siloxane bonding to at least a part of a region including a surface of the multilayer chip where neither the first external electrode nor the second external electrode is formed and surfaces of the first external electrode and the second external electrode, by contacting heated silicon rubber to the region.

4 Claims, 8 Drawing Sheets

(58) Field of Classification Search
USPC ............ 361/301.4, 306.3, 309, 321.1, 321.2, 361/321.3, 321.4
See application file for complete search history.

(56) References Cited

U.S. PATENT DOCUMENTS

| | | |
|---|---|---|
| 2003/0169556 A1 | 9/2003 | Yokoyama et al. |
| 2008/0151470 A1 | 6/2008 | Motoki et al. |
| 2011/0287176 A1 | 11/2011 | Saito et al. |
| 2013/0141836 A1 | 6/2013 | Saito et al. |
| 2016/0042864 A1 | 2/2016 | Hong et al. |
| 2017/0098506 A1 | 4/2017 | Ando et al. |
| 2018/0082786 A1 | 3/2018 | Asano et al. |
| 2019/0103224 A1 | 4/2019 | Han et al. |
| 2019/0198245 A1* | 6/2019 | Sanner .................. C04B 35/634 |

FOREIGN PATENT DOCUMENTS

| | | |
|---|---|---|
| JP | 2012004544 A | 1/2012 |
| JP | 2012021201 A | 2/2012 |
| JP | 2013062550 A | 4/2013 |
| JP | 2016063008 A | 4/2016 |
| JP | 2018014447 A | 1/2018 |
| WO | 2007119281 A1 | 10/2007 |

OTHER PUBLICATIONS

Notice of Allowance issued by U.S. Patent and Trademark Office, dated Mar. 31, 2022, for U.S. Appl. No. 16/737,619 (9 pages).

A First Office Action issued by the State Intellectual Property Office of China dated Jun. 6, 2022 for Chinese counterpart application No. 202010030535.9 (6 pages).

Non-Final Office Action issued by U.S. Patent and Trademark Office, dated Sep. 30, 2022, for co-pending U.S. Appl. No. 17/669,160 (24 pages).

* cited by examiner

MANUFACTURING METHOD OF CERAMIC ELECTRONIC DEVICE

CROSS-REFERENCE TO RELATED APPLICATION

This application is a divisional of U.S. patent application Ser. No. 16/737,619, filed Jan. 8, 2020, which is based upon and claims the benefit of priority of the prior Japanese Patent Application Publication No. 2019-007723, filed on Jan. 21, 2019 and Japanese Patent Application No. 2019-174522, filed on Sep. 25, 2019, each disclosure of which is herein incorporated by reference in its entirety. The applicant herein explicitly rescinds and retracts any prior disclaimers or disavowals or any amendment/statement otherwise limiting claim scope made in any parent, child or related prosecution history with regard to any subject matter supported by the present application.

FIELD

A certain aspect of the present invention relates to a ceramic electronic device and a manufacturing method of the ceramic electronic device.

BACKGROUND

For example, an external electrode of a ceramic electronic device such as a multilayer ceramic capacitor has a conductive resin layer in which a metal component and resin are mixed, in order to suppress stress when mounting the ceramic electronic device on a substrate (for example, see Japanese Patent Application Publication No. 2016-63008).

SUMMARY OF THE INVENTION

When the ceramic electronic device is used in high-temperature and high-humidity condition, the metal component of the conductive resin layer may diffuse because of water adhered to a surface of the ceramic electronic device. In this case, reliability of the ceramic electronic device may be degraded. Even if the external electrode does not have the conductive resin layer, a metal component of the external electrode may diffuse and the reliability may be degraded.

The present invention has a purpose of providing a ceramic electronic device and a manufacturing method of the ceramic electronic device that are capable of improving reliability of the ceramic electronic device.

According to an aspect of the present invention, there is provided a ceramic electronic device including: a multilayer chip in which each of a plurality of dielectric layers and each of a plurality of internal electrode layers are alternately stacked, a main component of the dielectric layers being ceramic, the multilayer chip having a rectangular parallelepiped shape, the plurality of internal electrode layers being alternately exposed to a first end face and a second end face of the multilayer chip, the first end face facing with the second end face, a first external electrode provided on the first end face; a second external electrode provided on the second end face; and an organic compound that is adhered to at least a part of a region including a surface of the multilayer chip where neither the first external electrode nor the second external electrode is formed and surfaces of the first external electrode and the second external electrode, and has a siloxane bonding.

According to another aspect of the present invention, there is provided a manufacturing method of a ceramic electronic device including; preparing a ceramic electronic device having a multilayer chip, a first external electrode and a second external electrode, bonding an organic compound having a siloxane bonding to at least a part of a region including a surface of the multilayer chip where neither the first external electrode nor the second external electrode is formed and surfaces of the first external electrode and the second external electrode, by contacting heated silicon rubber to the region, wherein the multilayer chip has a structure in which each of a plurality of dielectric layers and each of a plurality of internal electrode layers are alternately stacked, a main component of the dielectric layers being ceramic, the multilayer chip having a rectangular parallelepiped shape, the plurality of internal electrode layers being alternately exposed to a first end face and a second end face of the multilayer chip, the first end face facing with the second end face, wherein the first external electrode is provided on the first end face, therein the second external electrode provided on the second end face.

DETAILED DESCRIPTION

A description will be given of an embodiment with reference to the accompanying drawings.

Embodiment

Figure 1:
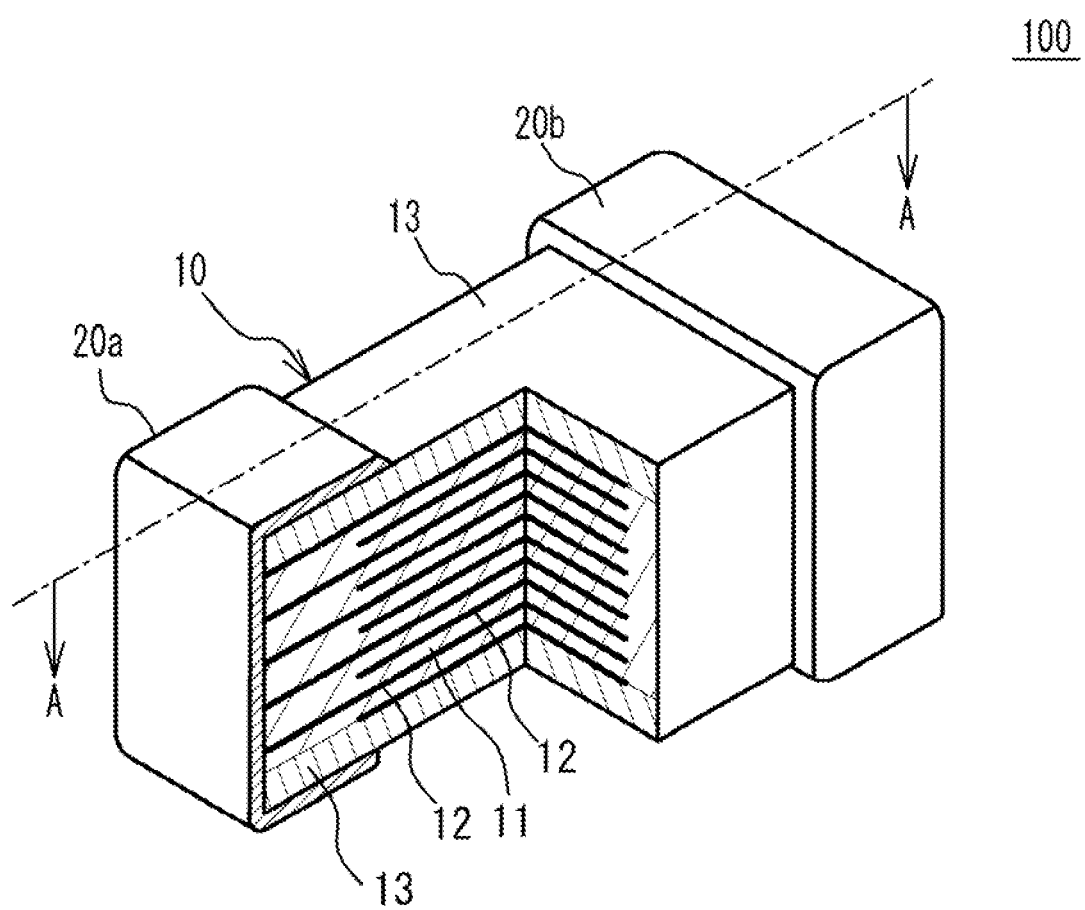
FIG. 1 illustrates a perspective view of a multilayer ceramic capacitor in which a cross section of a part of the multilayer ceramic capacitor is illustrated.

A description will be given of an outline of a multilayer ceramic capacitor. FIG. 1 illustrates a perspective view of a multilayer ceramic capacitor 100 in accordance with an embodiment, in which a cross section of a part of the multilayer ceramic capacitor 100 is illustrated. As illustrated in FIG. 1, the multilayer ceramic capacitor 100 includes a multilayer chip 10 having a rectangular parallelepiped shape, and a pair of external electrodes 20a and 20b that are respectively provided at two end faces of the multilayer chip 10 facing each other. In four faces other than the two end faces of the multilayer chip 10, two faces other than an upper face and a lower face of the multilayer chip 10 in a stacking direction are referred to as side faces. The external electrodes 20a and 20b extend to the upper face, the lower face and the two side faces of the multilayer chip 10. However, the external electrodes 20a and 20b are spaced from each other.

The multilayer chip 10 has a structure designed to have dielectric layers 11 and internal electrode layers 12 alternately stacked. The dielectric layer 11 includes ceramic material acting as a dielectric material. The internal electrode layers 12 include a base metal material. End edges of the internal electrode layers 12 are alternately exposed to a first end face of the multilayer chip 10 and a second end face of the multilayer chip 10 that is different from the first end face. In the embodiment, the first end face faces with the second end face. The external electrode 20a is provided on the first end face. The external electrode 20b is provided on the second end face. Thus, the internal electrode layers 12 are alternately conducted to the external electrode 20a and the external electrode 20b. Thus, the multilayer ceramic capacitor 100 has a structure in which a plurality of dielectric layers 11 are stacked and each two of the dielectric layers 11 sandwich the internal electrode layer 12. In a multilayer structure of the dielectric layers 11 and the internal electrode layers 12, the internal electrode layer 12 is positioned at an outermost layer in a stacking direction. The upper face and the lower face of the multilayer structure that are the internal electrode layers 12 are covered by cover layers 13. A main component of the cover layer 13 is a ceramic material. For example, a main component of the cover layer 13 is the same as that of the dielectric layer 11.

For example, the multilayer ceramic capacitor 100 may have a length of 0.25 mm, a width of 0.125 mm and a height of 0.125 mm. The multilayer ceramic capacitor 100 may have a length of 0.4 mm, a width of 0.2 mm and a height of 0.2 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

A main component of the internal electrode layers 12 is a base metal such as nickel (Ni), copper (Cu), tin (Sn) or the like. The internal electrode layers 12 may be made of a noble metal such as platinum (Pt), palladium (Pd), silver (Ag), gold (Au) or alloy thereof. The dielectric layers 11 are mainly composed of a ceramic material that is expressed by a general formula $ABO_3$ and has a perovskite structure. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $Ba_{1-x-y}Ca_xSr_yTi_{1-z}Zr_zO_3$ ($0 \le x \le 1$, $0 \le y \le 1$, $0 \le z \le 1$) having a perovskite structure.

Figure 2:
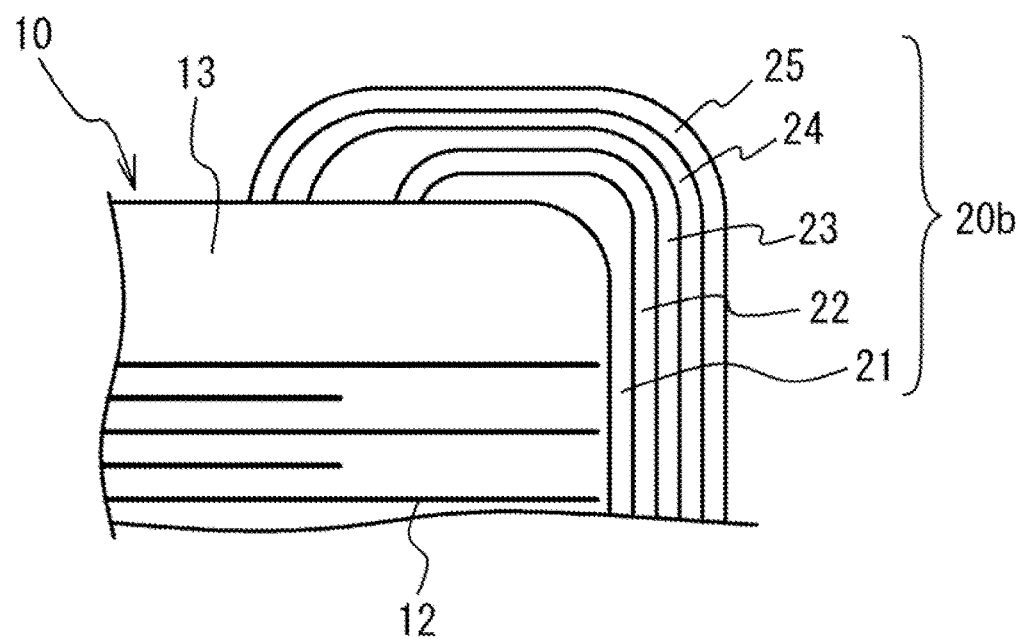
FIG. 2 illustrates a cross sectional view of an external electrode and is a partial cross sectional view taken along a line A-A of FIG. 1.

FIG. 2 illustrates a cross sectional view of the external electrode 20b and is a partial cross sectional view taken along a line A-A of FIG. 1. In FIG. 2, hatching for cross section is omitted. As illustrated in FIG. 2, the external electrode 20b has a structure in which a first plated layer 22 such as Cu, a conductive resin layer 23, a second plated layer 24 such as Ni and a third plated layer 25 such as Sn are formed on a ground layer 21 in this order. The ground layer 21, the first plated layer 22, the conductive resin layer 23, the second plated layer 24 and the third plated layer 25 extend toward the four side faces of the multilayer chip 10 from the both end faces of the multilayer chip 10.

A main component of the ground layer 21 is a metal such as Cu, Ni, Al (aluminum) or Zn (zinc). The ground layer 21 includes a glass component for densifying the ground layer 21 or a co-material for controlling sinterability of the ground layer 21. The ground layer 21 including these ceramic components has high adhesiveness with the cover layer 13 whose main component is a ceramic material. The conductive resin layer 23 is a resin layer including a metal component such as Ag. The conductive resin layer 23 is flexible. Therefore, the conductive resin layer 23 suppresses stress caused by deflection of a substrate on which the multilayer ceramic capacitor 100 is mounted. The first plated layer 22 is provided in order to increase adhesiveness between the ground layer 21 and the conductive resin layer 23. The external electrode 20a has the same structure as the external electrode 20b. The conductive resin layer 23 may not be necessarily provided.

When the external electrodes 20a and 20b have the structure illustrated in FIG. 2 and the multilayer ceramic capacitor 100 is used in high-temperature and high-humidity condition, a metal component of the conductive resin layer 23 may diffuse because of water adhered to the surface of the multilayer ceramic capacitor 100. In this case, reliability of the multilayer ceramic capacitor 100 may be degraded. For example, the metal component of the conductive resin layer 23 may diffuse to the surface of the multilayer chip 10 between the external electrode 20a and the external electrode 20b (migration phenomena). Even if the external electrodes 20a and 20b do not include the conductive resin layer 23, another metal component of the external electrodes 20a and 20b may diffuse.

Figure 3:
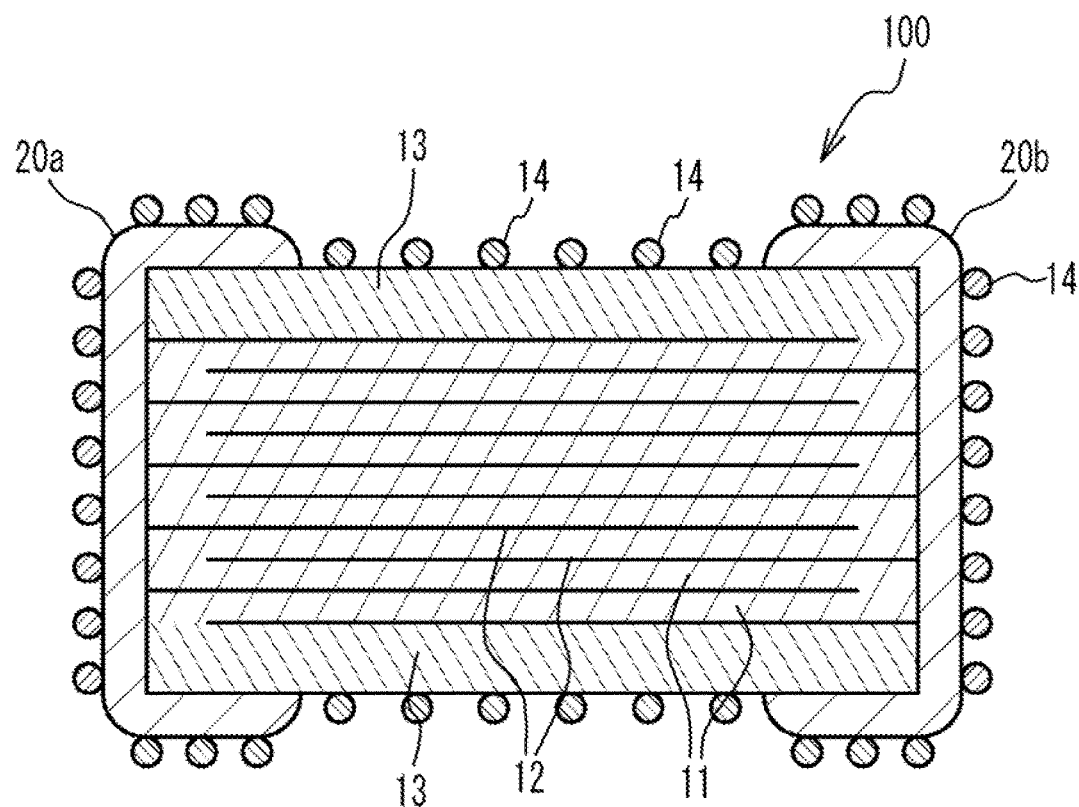
FIG. 3 illustrates a structure in which an organic compound is adhered to a multilayer ceramic capacitor.

And so, the multilayer ceramic capacitor 100 of the embodiment has a structure in which an organic compound 14 having siloxane bonding is adhered to at least a part of the surface of the multilayer ceramic capacitor 100, as illustrated in FIG. 3. That is, the organic compound 14 is adhered to at least a part of a region including the surface of the multilayer chip 10 where the external electrodes 20a and 20b are not formed and the surface of the surface of the external electrodes 20a and 20b.

When the organic compound 14 is adhered to the surface of the multilayer ceramic capacitor 100, the organic compound 14 may directly contact to the surface or the organic compound 14 and may be adhered to the surface through another film or the like. The same thing is applied to the following description.

In the embodiment, by a thermal analysis, it is confirmed that the organic compound 14 having the siloxane bonding is a small molecule cyclic siloxane which is a cyclic siloxane from D3 to D20. For example, the small molecule cyclic siloxane D3 is trimer of the cyclic siloxane which is a solid substance of hexamethyl cyclotrisiloxane ($C^6H_{18}O_3Si_3$). A boiling point of the small molecule cyclic siloxane D3 is 134 degrees C. The small molecule cyclic siloxane D4 is tetramer of the cyclic siloxane which is semi-solid substance of octamethyl cyclotetrasiloxane ($C_8H_{24}O_4Si_4$). A boiling point of the small molecule siloxane D4 is 175 degrees C.

The organic compound 14 releases the small molecule cyclic siloxane Dn (n≥3) at a relatively high temperature. Therefore, the small molecule cyclic siloxane Dn tends to be left after mounting the multilayer ceramic capacitor 100 with solder. The small molecule cyclic siloxane has water-repellent characteristic. Therefore, even if the multilayer ceramic capacitor 100 is used in high-temperature and high-humidity condition, adhesion of water to the surface of the multilayer ceramic capacitor 100 is suppressed. It is therefore possible to improve the reliability of the multilayer ceramic capacitor 100.

Even if the organic compound 14 is adhered to the surface of the external electrodes 20a and 20b, degradation of wettability of the solder is suppressed. The organic compound 14 is a coated article of which a molecule amount is small. Even if the organic compound 14 is coated on the Sn-plated layer (external electrode), the organic compound 14 does not have a large influence on melting of the solder. Therefore, even if the organic compound 14 is adhered to the surface of the external electrodes 20a and 20b, mounting characteristic can be achieved.

A region of the surface of the multilayer ceramic capacitor 100 to which the organic compound 14 is adhered is not limited. It is preferable that the organic compound 14 is adhered to at least a part of a region between the external electrode 20a and the external electrode 20b on the upper face, the lower face and the two side faces of the multilayer chip 10. This is because the adhesion of water to the surface of the multilayer chip 10 between the external electrode 20a and the external electrode 20b is suppressed, and the migration is suppressed.

Alternatively, it is preferable that the organic compound 14 covers the whole of the multilayer ceramic capacitor 100. This is because adhesion of water to the whole of the multilayer ceramic capacitor 100 is suppressed.

When the process for bonding the organic compound 14 to the surface of the multilayer ceramic capacitor 100 is adjusted, the temperature at which the small molecule cyclic siloxane Dn (n≥3) is released from the organic compound 14 can be increased. And so, it is preferable that the small molecule cyclic siloxane Dn (n≥3) is not released at a temperature less than 300 degrees C. and the small molecule cyclic siloxane Dn (n≥3) is released at a temperature which is equal to or more than 300 degrees C. It is preferable that there is at least one peak of released amount of the small molecule cyclic siloxane Dn (n≥3) at the temperature which is equal to or more than 300 degrees C. When there are a plurality of peaks (local maximum values of the released amount) of the released amount of the small molecule cyclic siloxane Dn (n≥3) at temperatures which are equal to or more than 300 degrees C., it is preferable that there is a maximum released amount peak from 320 degrees C. to 480 degrees C. In this case, when the multilayer ceramic capacitor 100 is mounted with solder at a temperature less than 300 degrees C., a larger amount of the small molecule cyclic siloxane Dn (n≥3) detected by the thermal analysis tends to be left in the organic compound 14.

When the amount of the organic compound 14 adhered to the multilayer ceramic capacitor 100 is excessively small, sufficient water-repellent characteristic may not be necessarily achieved. And so, it is preferable that the amount of the released small molecule cyclic siloxane Dn (n≥3) has a lower limit. For example, it is preferable that the amount of the organic compound 14 adhered to the surface of the multilayer ceramic capacitor 100 is large such that 0.50 ppm or more of the small molecule cyclic siloxane D3 is released per a unit area ($cm^2$) of the surface of the multilayer ceramic capacitor 100 from 300 degrees C. to 600 degrees C. It is more preferable that the amount of the organic compound 14 adhered to the multilayer ceramic capacitor 100 is large such that 2.0 ppm or more of the small molecule cyclic siloxane D3 is released per a unit area ($cm^2$) of the surface of the multilayer ceramic capacitor 100.

On the other hand, when the amount of the organic compound adhered to the multilayer ceramic capacitor 100 is excessively large, it may be difficult to mount the multilayer ceramic capacitor 100 on a substrate. And so, it is preferable that the released amount of the small molecule cyclic siloxane Dn (n≥3) has an upper limit. For example, it is preferable that the amount of the organic compound 14 adhered to the surface of the multilayer ceramic capacitor 100 is small such that 30 ppm or less of the small molecule cyclic siloxane D3 is released per a unit area ($cm^2$) of the surface of the multilayer ceramic capacitor 100 from 300 degrees C. to 600 degrees C. It is more preferable that the amount of the organic compound 14 adhered to the multilayer ceramic capacitor 100 is small such that 25 ppm or less of the small molecule cyclic siloxane D3 is released per a unit area ($cm^2$) of the surface of the multilayer ceramic capacitor 100.

Figure 4:
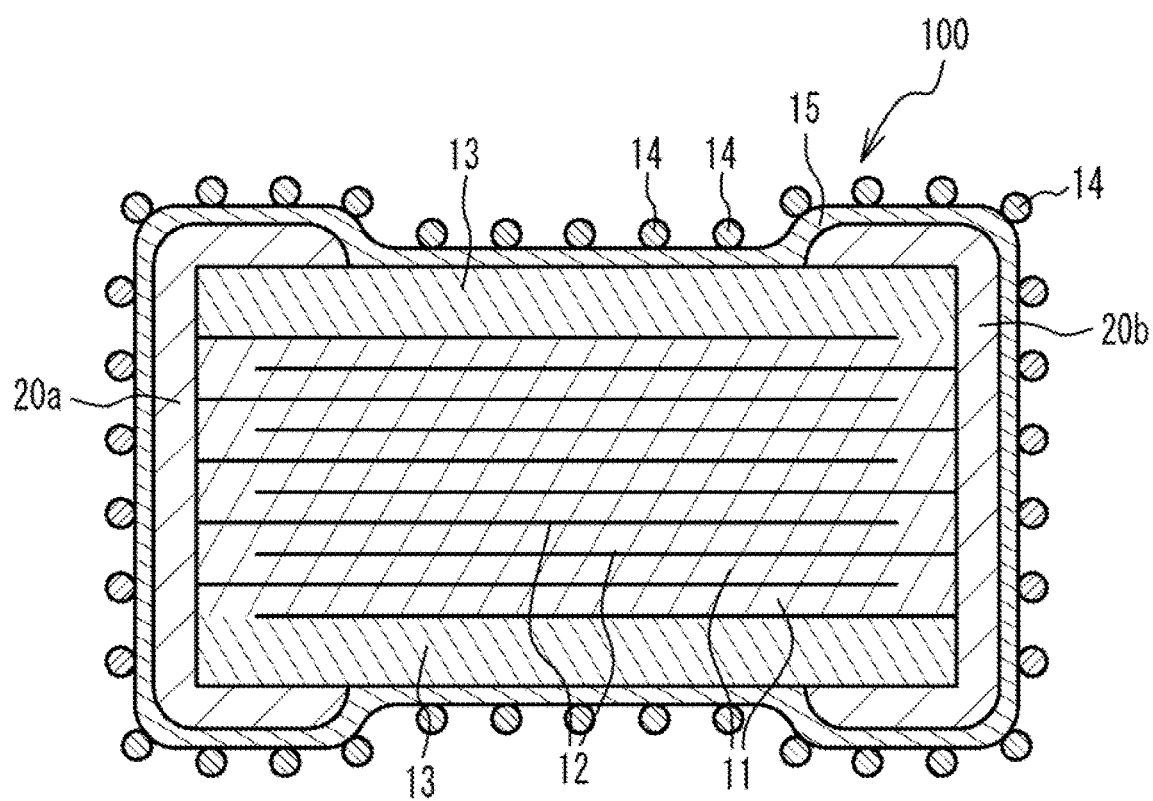
FIG. 4 illustrates a structure in which a silane film and an organic compound are provided on a multilayer ceramic capacitor.

As illustrated in FIG. 4, it is preferable that a silane film 15 is provided on the surface of the multilayer ceramic capacitor 100, and the organic compound 14 is adhered on the silane film 15. That is, it is preferable that the silane film 15 is provided on at least a part of the region including the surface of the multilayer chip 10 where the external electrodes 20a and 20b are not provided and the surface of the external electrodes 20a and 20b, and the organic compound 14 is adhered on the silane film 15. With the structure, the organic compound 14 is strongly bonded to the surface of the multilayer ceramic capacitor 100, by silane coupling effect. Therefore, the releasing of the small molecule cyclic siloxane Dn (n≥3) from the organic compound 14 is suppressed at a temperature less than 300 degrees C., as in the case of a thermal analysis result of "impregnation+contact heating" of FIG. 8 described later.

Figure 5:
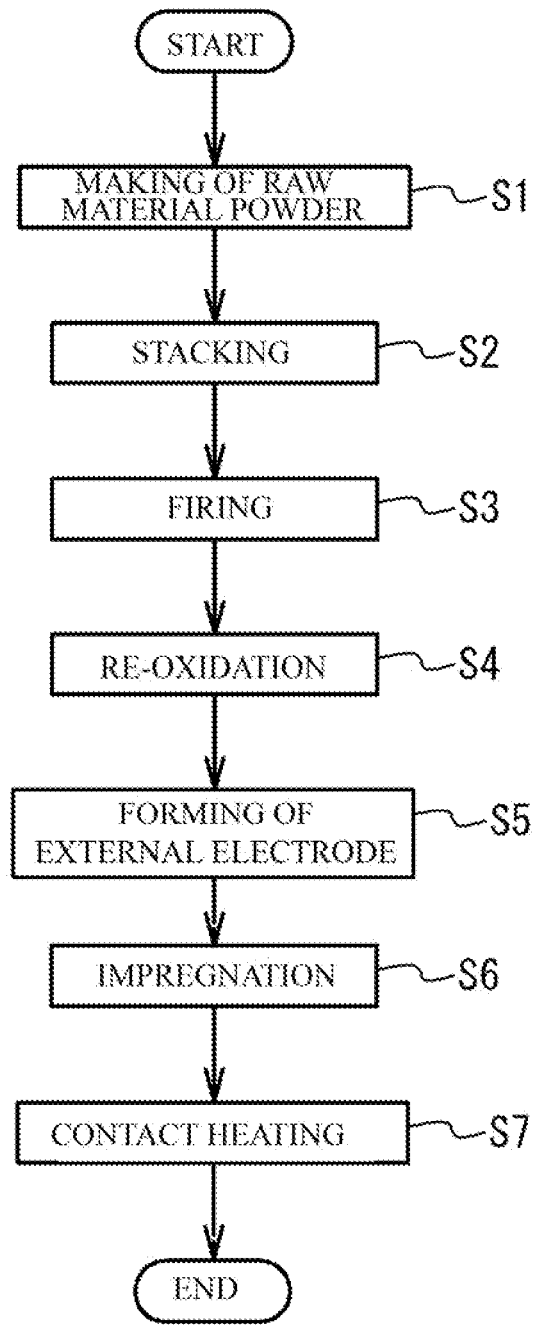
FIG. 5 illustrates a manufacturing method of a multilayer ceramic capacitor.

Next, a description will be given of a manufacturing method of the multilayer ceramic capacitor 100. FIG. 5 illustrates a manufacturing method of the multilayer ceramic capacitor 100.

Making Process of Raw Material Powder

A dielectric material for forming the dielectric layer 11 is prepared. Generally, an A site element and a B site element are included in the dielectric layer 11 in a sintered phase of grains of $ABO_3$. For example, $BaTiO_3$ is tetragonal compound having a perovskite structure and has a high dielectric constant. Generally, $BaTiO_3$ is obtained by reacting a titanium material such as titanium dioxide with a barium material such as barium carbonate and synthesizing barium titanate. Various methods can be used as a synthesizing method of the ceramic structuring the dielectric layer 11. For example, a solid-phase method, a sol-gel method, a hydrothermal method or the like can be used. The embodiment may use any of these methods.

An additive compound may be added to resulting ceramic powders, in accordance with purposes. The additive compound may be an oxide of Mg (magnesium), Mn (manganese), V (vanadium), Cr (chromium) or a rare earth element (Y (yttrium), Sm (samarium), Eu (europium), Gd (gadolinium), Tb (terbium), Dy (dysprosium), Ho (holmium), Er (erbium), Tm (thulium) and Yb (ytterbium)), or an oxide of Co (cobalt), Ni, Li (lithium), B (boron), Na (sodium), K (potassium) and Si, or glass.

In the embodiment, it is preferable that ceramic particles structuring the dielectric layer 11 are mixed with compound including additives and are calcined in a temperature range from 820 degrees C. to 1150 degrees C. Next, the resulting ceramic particles are wet-blended with additives, are dried and crushed. Thus, ceramic powder is obtained. For example, it is preferable that an average grain diameter of the resulting ceramic powder is 50 nm to 300 nm from a viewpoint of thickness reduction of the dielectric layer 11. The grain diameter may be adjusted by crushing the resulting ceramic powder as needed. Alternatively, the grain diameter of the resulting ceramic power may be adjusted by combining the crushing and classifying.

Stacking Process

Next, a binder such as polyvinyl butyral (PVB) resin, an organic solvent such as ethanol or toluene, and a plasticizer are added to the resulting dielectric material and wet-blended. With use of the resulting slurry, a strip-shaped dielectric green sheet with a thickness of 0.8 μm or less is coated on a base material by, for example, a die coater method or a doctor blade method, and then dried.

Next, metal conductive paste for forming an internal electrode is coated on the surface of the dielectric green sheet by screen printing or gravure printing. The metal conductive paste includes an organic binder. Thus, a pattern for forming an internal electrode layer is provided. As co-materials, ceramic particles are added to the metal conductive paste. A main component of the ceramic particles is not limited. However, it is preferable that the main component of the ceramic particles is the same as that of the dielectric layer 11.

Then, the dielectric green sheets are alternately stacked while the base material is peeled so that the internal electrode layers 12 and the dielectric layers 11 are alternated with each other and the end edges of the internal electrode layers 12 are alternately exposed to both end faces in the length direction of the dielectric layer 11 so as to be alternately led out to the pair of external electrodes 20a and 20b of different polarizations. For example, a total number of the staked dielectric green sheets is 100 to 500.

After that, a cover sheet to be the cover layer 13 is cramped on the multilayer structure of the dielectric green sheets. And another cover sheet to be the cover layer 13 is cramped under the multilayer structure. Thus, a ceramic multilayer structure is obtained. After that, the binder is removed from the ceramic multilayer structure (for example, 1.0 mm×0.5 mm) in $N_2$ atmosphere of 250 degrees C. to 500 degrees C.

Firing Process

The resulting compact is fired for ten minutes to 2 hours in a reductive atmosphere having an oxygen partial pressure of $10^{-7}$ to $10^{-10}$ atm in a temperature range of 1100 degrees C. to 1300 degrees C. In this manner, it is possible to manufacture the multilayer ceramic capacitor 100.

Re-oxidizing Process

After that, a re-oxidizing process may be performed in $N_2$ gas atmosphere in a temperature range of 600 degrees C. to 1000 degrees C.

Metal paste including a metal filler, a glass frit, a binder and a solvent is coated on the both end faces of the multilayer chip 10, and is dried. After that, the metal paste is baked. Thus, the ground layer 21 is formed. The binder and the solvent vaporize by the baking. In the method, it is preferable that the metal filler is Cu or the like. It is preferable that the baking is performed for 3 minutes to 30 minutes in a temperature range of 700 degrees C. to 900 degrees C. It is more preferable that the baking is performed for 5 minutes to 15 minutes in a temperature range of 760 degrees C. to 840 degrees C. After that, the first plated layer 22 may be formed on the ground layer 21 by plating.

Next, the conductive resin layer 23 is formed. For example, the conductive resin layer 23 is formed by immersion-coating thermosetting resin such as epoxy resin or phenol resin in which conductive fillers such as Ag, Ni, Cu or the like are kneaded, on the surface of the first plated layer 22, and hardening the thermosetting resin by thermal treatment. The thickness of the conductive resin layer 23 is not limited. For example, the thickness of the conductive resin layer 23 is approximately 10 μm to 50 μm. The thickness of the conductive resin layer 23 may be determined in accordance with the size of the multilayer ceramic capacitor 100. After that, the second plated layer 24 and the third plated layer 25 are formed on the conductive resin layer 23 by electroplating or the like.

Impregnation Process

Next, the silane film 15 is formed on the surface of the multilayer ceramic capacitor 100, by impregnation of silane coupling agent. However, the impregnation process may not be necessarily performed.

Contact Heating Process

Next, silicon rubber is heated to 120 degrees C. or more and is contacted to the surface of the multilayer ceramic capacitor 100. Thus, it is possible to bond the organic compound 14 to at least a part of the region including the region of the surface of the multilayer chip 10 where the external electrodes 20a and 20b are not provided and the surface of the external electrodes 20a and 20b. When the impregnation process is performed, the organic compound 14 is adhered on the silane film 15.

In the manufacturing method of the embodiment, the organic compound 14 is adhered to at least a part of the region including the region of the surface of the multilayer chip 10 where the external electrodes 20a and 20b are not formed and the surface of the surface of the external electrodes 20a and 20b. The organic compound 14 releases the small molecule cyclic siloxane Dn (n≥3) at a relatively high temperature. Therefore, the small molecule cyclic siloxane Dn tends to be left after mounting the multilayer ceramic capacitor 100 with solder. The small molecule cyclic siloxane has water-repellent characteristic. Therefore, even if the multilayer ceramic capacitor 100 is used in high-temperature and high-humidity condition, adhesion of water to the surface of the multilayer ceramic capacitor 100 is suppressed. It is therefore possible to improve the reliability of the multilayer ceramic capacitor 100.

When the silicon rubber is heated to 120 degrees C. or more and is contacted to the surface of the multilayer ceramic capacitor 100, the temperature at which the small molecule cyclic siloxane Dn (n≥3) is released from the organic compound 14 is 300 degrees C. or more.

Figure 6:
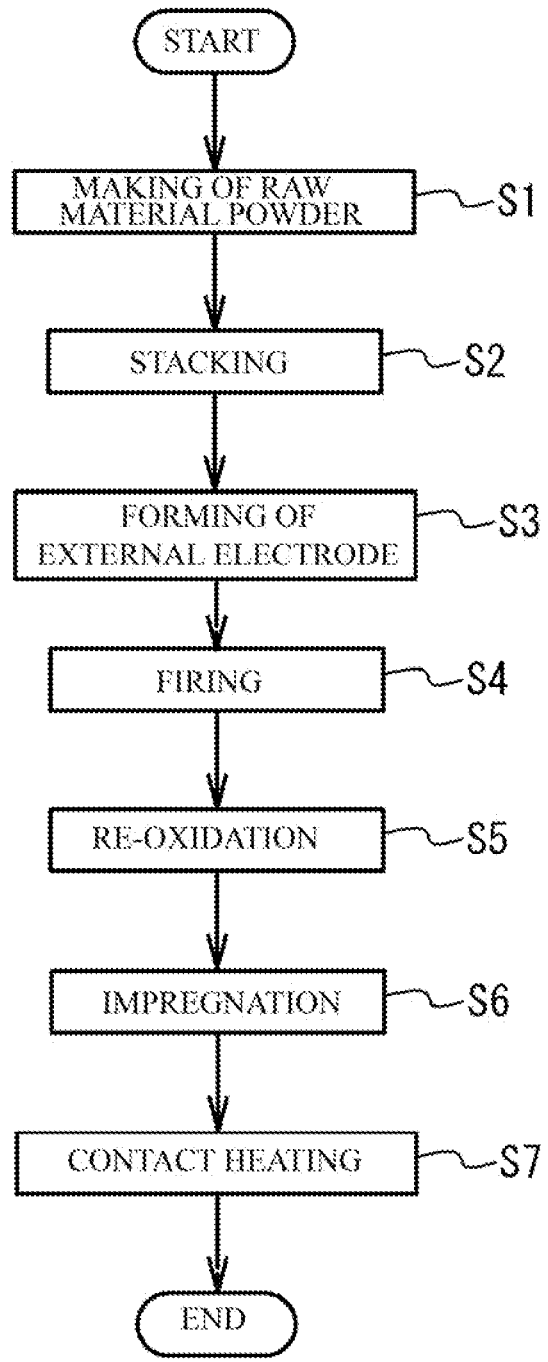
FIG. 6 illustrates a manufacturing method of a multilayer ceramic capacitor.

The ground layer 21 may be fired together with the multilayer chip 10. In this case, as illustrated in FIG. 6, the binder is removed from the ceramic multilayer structure in $N_2$ atmosphere of 250 degrees C. to 500 degrees C. After that, metal paste including a metal filler, a co-material, a binder and a solvent is coated on the both end faces of the ceramic multilayer structure by a dipping method or the like and is dried. After that, the metal paste is fired together with the ceramic multilayer structure. Firing condition is described in the above-mentioned firing process. After that, a re-oxidizing process may be performed in $N_2$ gas atmosphere in a temperature range of 600 degrees C. to 1000 degrees C. After that, the first plated layer 22 is formed on the ground layer 21 by plating. Next, the conductive resin layer 23 is formed on the first plated layer 22. After that, the second plated layer 24 and the third plated layer 25 are formed on the conductive resin layer 23 by electroplating or the like.

Figure 7:
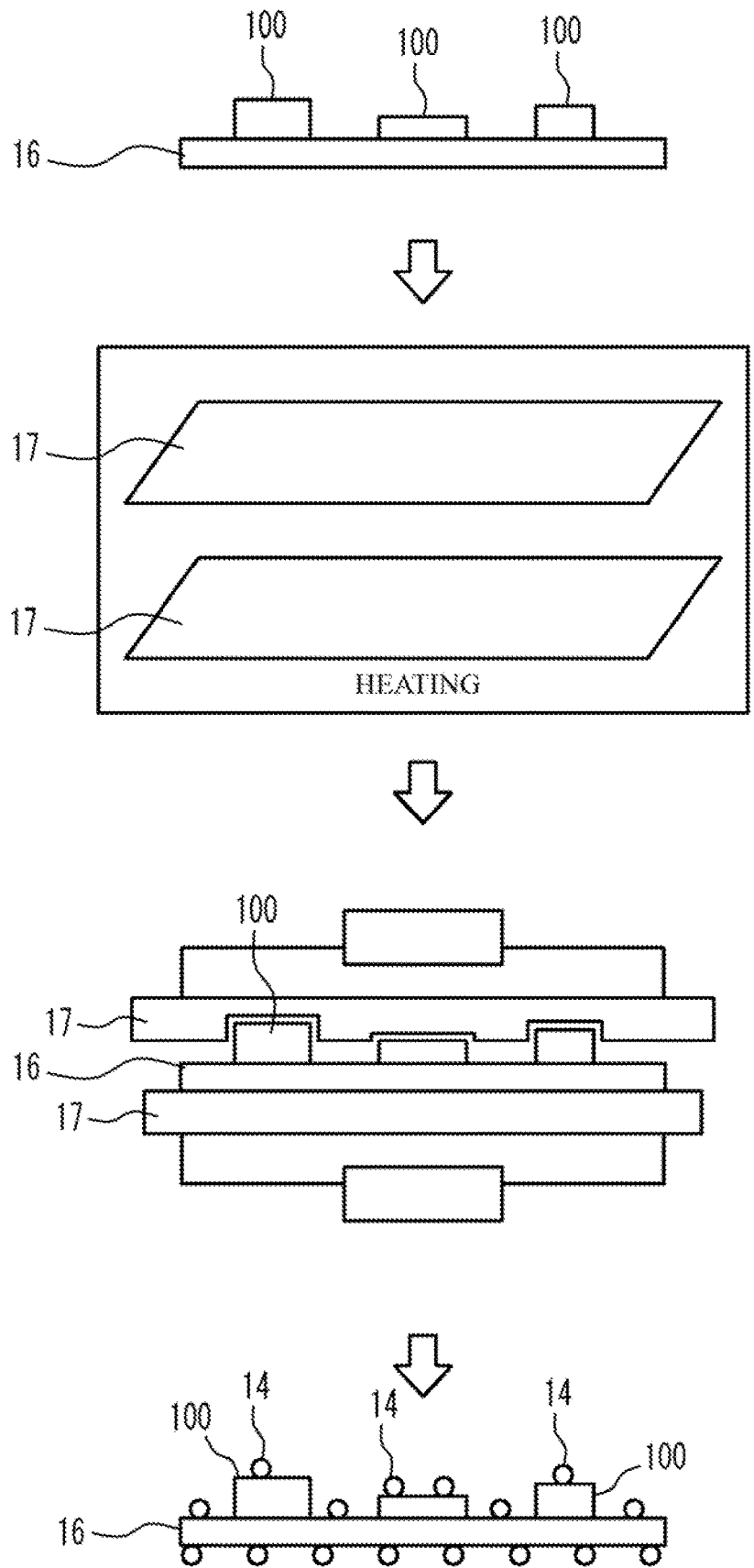
FIG. 7 illustrates a case where a silicon sheet is pressed to a multilayer ceramic capacitor.

As illustrated in FIG. 7, the multilayer ceramic capacitors 100 may be mounted on a substrate 16 before bonding the organic compound to the multilayer ceramic capacitors 100. A sheet 17 of the silicon rubber may be heated and may be pressed to the multilayer ceramic capacitors 100. Thereby, the organic compound 14 may be adhered to at least a part of the region including the region of the surface of the multilayer chip 10 where the external electrodes 20a and 20b are not provided and the surface of the external electrodes 20a and 20b. In this case, the organic compound 14 is adhered to the substrate 16. It is therefore possible to suppress breakdown caused by condensation on the surface of the substrate 16. It is possible to suppress defect of mounting, because the multilayer ceramic capacitors 100 are mounted before pressing the sheet 17 of the silicon rubber to the multilayer ceramic capacitors 100. It is preferable that an apparent density of the sheet 17 of the silicon rubber is 0.75 $g/cm^3$ or less. This is because, when the apparent density of the silicon rubber is large, the sheet 17 is hardened. And, when the apparent density of the silicon rubber is large and the sheet 17 is pressed to the multilayer ceramic capacitor 100, it is not possible to sufficiently cover the chips with the sheet 17. And, when the sheet 17 having a large apparent density is pressed so as to cover the chips, excessive force is applied to the chips and the chips may be damaged. The apparent density is mass of the sheet 17 with respect to the volume of the sheet 17.

In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

EXAMPLES

The multilayer ceramic capacitors in accordance with the embodiment were made and the property was measured.

Examples 1 to 6

An organic binder was kneaded with ceramic powder, of which a main component was barium titanate, having reduction resistant. Thus, slurry was prepared. The slurry was formed into a sheet by doctor blade. Thus, a dielectric green sheet was made. Metal conductive paste of Ni having a predetermined pattern was coated the dielectric green sheet by screen printing. Thus, an internal electrode pattern was formed. The dielectric green sheet on which the internal electrode pattern was formed was stamped into a predetermined size. And a predetermined number of the dielectric green sheets were stacked. And a ceramic multilayer structure was made by thermos-compression.

Next, the ceramic multilayer structure was cut into predetermined chip sizes and was divided. Metal paste including a co-material was coated on the both end faces of the ceramic multilayer structure (faces exposed to external electrodes) by an immersion method so that the metal paste has a predetermined electrode width (E size).

Next, the resulting ceramic multilayer structure was fired at a 1250 degrees C. in nitrogen or hydrogen atmosphere and was subjected to a predetermined thermal treatment. Thus, the ground layer 21 covering the multilayer chip 10 and the both end faces of the multilayer chip 10. Next, the surface of the ground layer 21 was subjected to dry polishing with use of "whitemorundum" (registered trademark) as a polishing agent. After that, the first plated layer 22 was formed by Cu-plating. Next, conductive resin paste of which viscosity was adjusted to a predetermined value (10 to 30 Pa·s) was coated on the surface of the first plated layer 22 by an immersion method. Epoxy resin in which an Ag filler was kneaded was used as the conductive resin paste. After that, the conductive resin layer 23 was formed by hardening the conductive resin paste by a thermal treatment. And, the second plated layer 24 and the third plated layer 25 were formed on the conductive resin layer 23 by Ni-plating and Sn-plating. The resulting multilayer ceramic capacitor 100 had a length of 3.2 mm, a width of 2.5 mm and a height of 2.5 mm.

In the examples 1 to 4, silicon rubber was heated together with the multilayer ceramic capacitor 100. And the silicon rubber was contacted to the surface of the multilayer ceramic capacitor 100. Thus, the organic compound 14 was adhered to the surface of the multilayer ceramic capacitor 100. In the example 1, the heating temperature of the silicon rubber was 120 degrees C. In the example 2, the heating temperature of the silicon rubber was 150 degrees C. In the example 3, the heating temperature of the silicon rubber was 180 degrees C. In the example 4, the heating temperature of the silicon rubber was 210 degrees C.

In the examples 5 and 6, the silane film 15 was formed on the surface of the multilayer ceramic capacitor 100 by the impregnation process of the silane coupling agent. After that, silicon rubber was heated together with the multilayer ceramic capacitor 100. And the silicon rubber was contacted to the multilayer ceramic capacitor 100. Thus, the organic compound 14 was adhered to the surface of the multilayer ceramic capacitor 100. In the example 5, the heating temperature of the silicon rubber was 150 degrees C. In the example 6, the heating temperature of the silicon rubber was 210 degrees C.

In the comparative example, the silane film 15 was not formed. Moreover, the organic compound 14 was not adhered (without water-repellent process).

Figure 8:
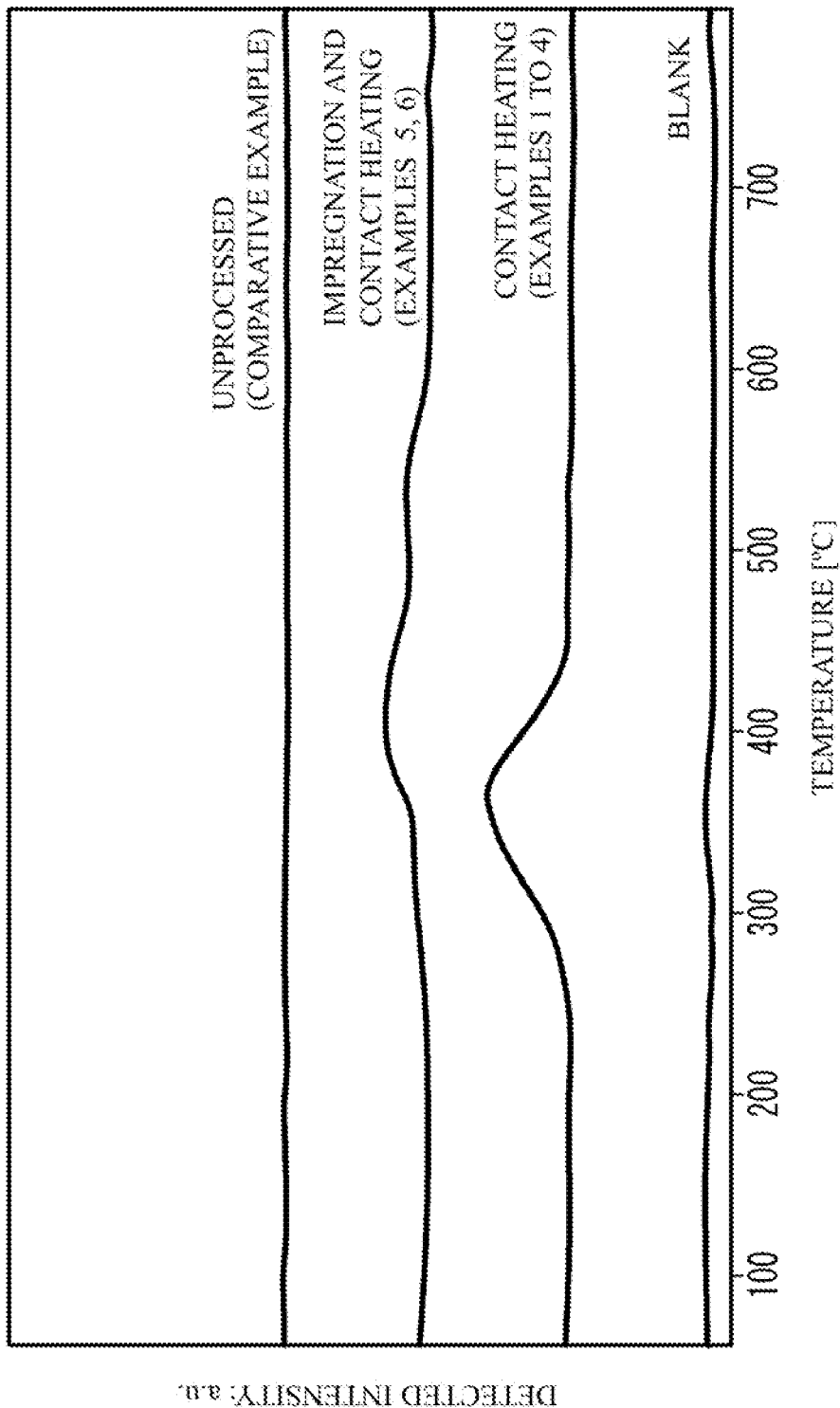
FIG. 8 illustrates analysis results of a cyclic siloxane.

With respect to the multilayer ceramic capacitors 100 of the examples 1 to 6 and the comparative example, it was confirmed whether the small molecule cyclic siloxane Dn (n≥3) was released. The multilayer ceramic capacitors 100 were heated from a room temperature to 600 degrees C., and the component of the gas and the released amount from the mass of the released gas were analyzed, by gas chromatograph quadrature mass spectrometry: GC-MS (Gas Chromatography Mass Spectrometry) (MPS2-xt made by GERSTER/GC7890B/5977A MSD made by Agilent). FIG. 8 illustrates analyzed results of the cyclic siloxane.

Analysis condition was as follows.
[Heating Desorption Condition]

40 degrees C. (0.5 minute) →

60 degrees C./minute → 300 degrees C. (30 minutes)

cooling condition: −100 degrees C. (0.5 minute) →

12 degrees C./second → 320 degrees C. (5 minutes)

[Gas Chromatograph Condition]

separation column: DB-1*Ms* (made by *Agilent*)

-continued temperature elevation condition: 60 degrees C.(5 minutes) →

10 degrees C./minute → 310 degrees C.(4 minutes)

[Mass Analysis Condition]
ionization method: electron ionization
measured mass range: m/z=20 to 800
[Quantifying Method]
Relative concentration was used by using decamethylcyclopentasiloxane (pentamer of cyclic siloxane).

As illustrated in FIG. 8, in the comparative example, releasing of the small molecule cyclic siloxane was not observed. It is thought that this was because the silicon rubber was not contacted to the multilayer ceramic capacitor 100. On the other hand, in the examples 1 to 6, the releasing of the small molecule cyclic siloxane was observed at a temperature which was equal to or more than 300 degrees C. It is thought that this was because the silicon rubber was contacted to the multilayer ceramic capacitors 100. The small molecule cyclic siloxane was a compound having siloxane bonding. It is thought that the cyclic siloxane was not released at a temperature which was less than 300 degrees C. because the silicon rubber was contacted to the surface of the multilayer ceramic capacitor 100 and the cyclic siloxane was released after a part of bonding of the organic compound 14 having the siloxane bonding was broken.

In the examples 1 to 4, the releasing of the small molecule cyclic siloxane was observed at a temperature which was equal to 300 degrees C. or more. And, the releasing of the small molecule cyclic siloxane was hardly observed at a temperature which was approximately 400 degrees C. or more. The released amount peak was observed at a temperature which was equal to 300 degrees C. or more. On the other hand, in the examples 5 and 6, the releasing of the small molecule cyclic siloxane was widely observed from 300 degrees C. to 550 degrees C. It is thought that this was because the organic compound having the siloxane bonding was strongly bonded to the silane film on the surface of the multilayer ceramic capacitor 100 because the silane film 15 was formed.

Next, in the examples 1 to 6, it was confirmed whether the small molecule cyclic siloxane Dn (n≥3) was released from 300 degrees C. to 600 degrees C., with respect to other samples. Table 1 shows the analyzed result of the example 2. As shown in Table 2, it was confirmed that a quantitative value of the released amount of the small molecule cyclic siloxane of D3 to D20 was obtained. When the value of "n" was smaller, the released amount was larger. It is thought that this was because when the value of "n" was smaller, the molecular weight was smaller.

TABLE 1

| CYCLIC SILOXANE | | QUANTITATIVE VALUE ppm (w/w) |
| --- | --- | --- |
| TRIMER | D3 | 2.3 |
| TETRAMER | D4 | 0.5 |
| PENTAMER | D5 | <0.1 |
| HEXAMER | D6 | <0.1 |
| HEPTAMER | D7 | <0.1 |
| OCTAMER | D8 | <0.1 |
| NONAMER | D9 | <0.1 |
| DECAMER | D10 | <0.1 |
| UNDECAMER | D11 | <0.1 |

TABLE 1-continued

| CYCLIC SILOXANE | | QUANTITATIVE VALUE ppm (w/w) |
| --- | --- | --- |
| DODECAMER | D12 | <0.1 |
| TRIDECAMER | D13 | <0.1 |
| TETRADECAMER | D14 | <0.1 |
| PENTADECAMER | D15 | <0.1 |
| HEXADECAMER | D16 | <0.1 |
| HEPTADECAMER | D17 | <0.1 |
| OCTADECAMER | D18 | <0.1 |
| NONEDECAMER | D19 | <0.1 |
| ICOSAMER | D20 | <0.1 |

Next, 400 samples were subjected to a mounting test, with respect to each of the examples 1 to 6 and the comparative example. In the mounting test, a reflow furnace of which a maximum temperature was 270 degrees C. or more was used. And, an external view was observed with respect to each sample. When the crawling angle of the edge of the solder fillet was less than 90 degrees with respect to the edge face of the external electrode, it was determined as acceptance. When the crawling angle was 90 degrees or more, it was determined as non-acceptance. A ratio of samples determined as non-acceptance was measured with respect to 400 samples.

Next, other 400 samples were subjected to a humidity resistance test, with respect to each of the examples 1 to 6 and the comparative example. In the humidity resistance test, each sample was left under a condition at a temperature of 120 degrees C. and at a relative humidity of 85%. And, a voltage of 1.5 times as much as a rated voltage was applied to each sample for 100 hours. And an electrical value (insulating resistance between electrodes) was measured. When the insulating resistance×a capacity was 100 MΩ·μF or more, it was determined as acceptance. When the insulating resistance×the capacity was less than 100 MΩ·μF, it was determined as non-acceptance. A ratio of samples determined as non-acceptance was measured with respect to 400 samples.

Next, other 400 samples were subjected to a condensation test, with respect to each of the examples 1 to 6 and the comparative example. The samples were mounted on reliable substrates (CEM 3). The samples were put in a thermohygrostat tank. And, 16 V was applied to the samples. A condensation test program of JIS 60068-2-30 was performed 6 times. After that, it was confirmed whether the migration occurred or not. The condition of each cycle of the program is as follows. (1) The humidity was kept at 98%. The temperature was changed from 25 degrees C. to 55 degrees C. for 3 hours. (2) The temperature was kept at 55 degrees C. The humidity was changed from 98% to 93% for 15 minutes. (3) The temperature was kept at 55 degrees C. and the humidity was kept at 93% for 9 hours and 25 minutes. (4) The humidity was kept at 93%. The temperature was changed from 55 degrees C. to 25 degrees C. for three hours. (5) The temperature was kept at 25 degrees C. and the humidity was kept at 93% for 3 hours. (6) The temperature was kept at 25 degrees C. The humidity was changed from 93% to 98% for 5 hours and 30 minutes. Each sample was observed by a stereomicroscope of 40 magnifications. And it was determined whether there was a precipitate between external electrodes. When there was a precipitate, it was determined that the migration occurred. A ratio of samples in which the migration occurred was measured with respect to 400 samples.

Table 2 shows the released amount of the small molecule cyclic siloxane D3 from 300 degrees C. to 600 degrees C. and results of the mounting test, the humidity resistance test and the condensation test. As shown in Table 2, the releasing of the small molecule cyclic siloxane D3 was not observed in the comparative example. It is thought that this was because the silicon rubber was not contacted to the multilayer ceramic capacitor 100. Next, the releasing of the small molecule cyclic siloxane D3 was observed, in the examples 1 to 6. It is thought that this was because the silicon rubber was heated and contacted to the multilayer ceramic capacitor 100.

TABLE 2

|  | COMPARATIVE EXAMPLE | WITHOUT SILANE | | | | WITH SILANE | |
| --- | --- | --- | --- | --- | --- | --- | --- |
|  |  | EXAMPLE 1 | EXAMPLE 2 | EXAMPLE 3 | EXAMPLE 4 | EXAMPLE 5 | EXAMPLE 6 |
| HEATING TEMPERATURE [° C.] | UNPROCESSED | 120 | 150 | 180 | 210 | 150 | 210 |
| RELEASED AMOUNT OF D3 [ppm/cm$^2$] | 0 | 0.46 | 2.17 | 9.41 | 23.89 | 3.74 | 29.76 |
| MOUNTING TEST | 0/400 | 0/400 | 0/400 | 0/400 | 0/400 | 0/400 | 2/400 |
| HUMIDITY TEST | 7/400 | 2/400 | 0/400 | 0/400 | 0/400 | 0/400 | 0/400 |
| CONDENSATION TEST | 23/400 | 3/400 | 0/400 | 0/400 | 0/400 | 0/400 | 0/400 |

The descending order of the released amount of the small molecule cyclic siloxane D3 was the example 1, the example 2, the example 3 and the example 4. It is thought that this was because the amount of the organic compound adhered to the samples was larger when the heating temperature of the silicon rubber was higher. Similarly, the released amount of the small molecule cyclic siloxane D3 of the example 6 was larger than that of the example 5. It is also thought that this was because the amount of the organic compound adhered to the samples was larger when the heating temperature of the silicon rubber was higher.

Next, the non-acceptance rate of the mounting test was low in the examples 1 to 6 and the comparative example. It is thought that this was because the released amount of the low molecule cyclic siloxane D3 per unit area was 30 ppm/cm' or less. It was confirmed that it was preferable that the released amount of the low molecule cyclic siloxane D3 per unit area was 25 ppm or less, because there were no samples determined as non-acceptance in the examples 1 to 5.

Next, in the comparative example, the non-acceptance rate of the humidity resistance test was high. On the other hand, in the examples 1 to 6, the non-acceptance rate of the humidity resistance test was low. It is thought that this was because the water-repellent characteristic was achieved because the organic compound 14 was formed. It was confirmed that it was preferable that the heating temperature of the silicon rubber was 150 degrees C. or more, because there were no samples determined as non-acceptance in the examples 2 to 6.

Next, non-acceptance rate of the condensation test of the comparative example was high. On the other hand, the non-acceptance rate of the condensation test was low in the examples 1 to 6. It is thought that this was because the water-repellent characteristic was achieved because the organic compound 14 was formed. It was confirmed that it was preferable that the heating temperature of the silicon rubber was 150 degrees C. or more, because there were no samples determined as non-acceptance in the examples 2 to 6.

Although the embodiments of the present invention have been described in detail, it is to be understood that the various change, substitutions, and alterations could be made hereto without departing from the spirit and scope of the invention.

What is claimed is:

1. A manufacturing method of a ceramic electronic device comprising:

preparing a ceramic electronic device having a multilayer chip, a first external electrode and a second external electrode, and bonding an organic compound having a siloxane bonding to at least a part of a region including a surface of the multilayer chip where neither the first external electrode nor the second external electrode is formed and surfaces of the first external electrode and the second external electrode, by contacting heated silicon rubber to the region, wherein the multilayer chip has a structure in which each of a plurality of dielectric layers and each of a plurality of internal electrode layers are alternately stacked, a main component of the dielectric layers being ceramic, the multilayer chip having a rectangular parallelepiped shape, the plurality of internal electrode layers being alternately exposed to a first end face and a second end face of the multilayer chip, the first end face facing with the second end face, wherein the first external electrode is provided on the first end face, therein the second external electrode provided on the second end face.

2. The method as claimed in claim 1, wherein the organic compound is adhered to at least the part of the region including the surface of the multilayer chip where neither the first external electrode nor the second external electrode is formed and the surfaces of the first external electrode and the second external electrode, by mounting the ceramic electronic device on a substrate before the organic compound is adhered and contacting the heated silicon rubber to the ceramic electronic device.

3. The method as claimed in claim 1, wherein the silicon rubber that is heated to 120 degrees C. or more is contacted to the region including the surface of the multilayer chip where neither the first external electrode nor the second external electrode is formed and the surfaces of the first external electrode and the second external electrode.

4. The method as claimed in claim 1 further comprising:
   forming a silane film on the ceramic electronic device before the organic compound is adhered by impregnation of a silane coupling agent to the ceramic electronic device,
   wherein the organic compound is provided on the silane film.

* * * * *